United States Patent Office 3,320,036
Patented May 16, 1967

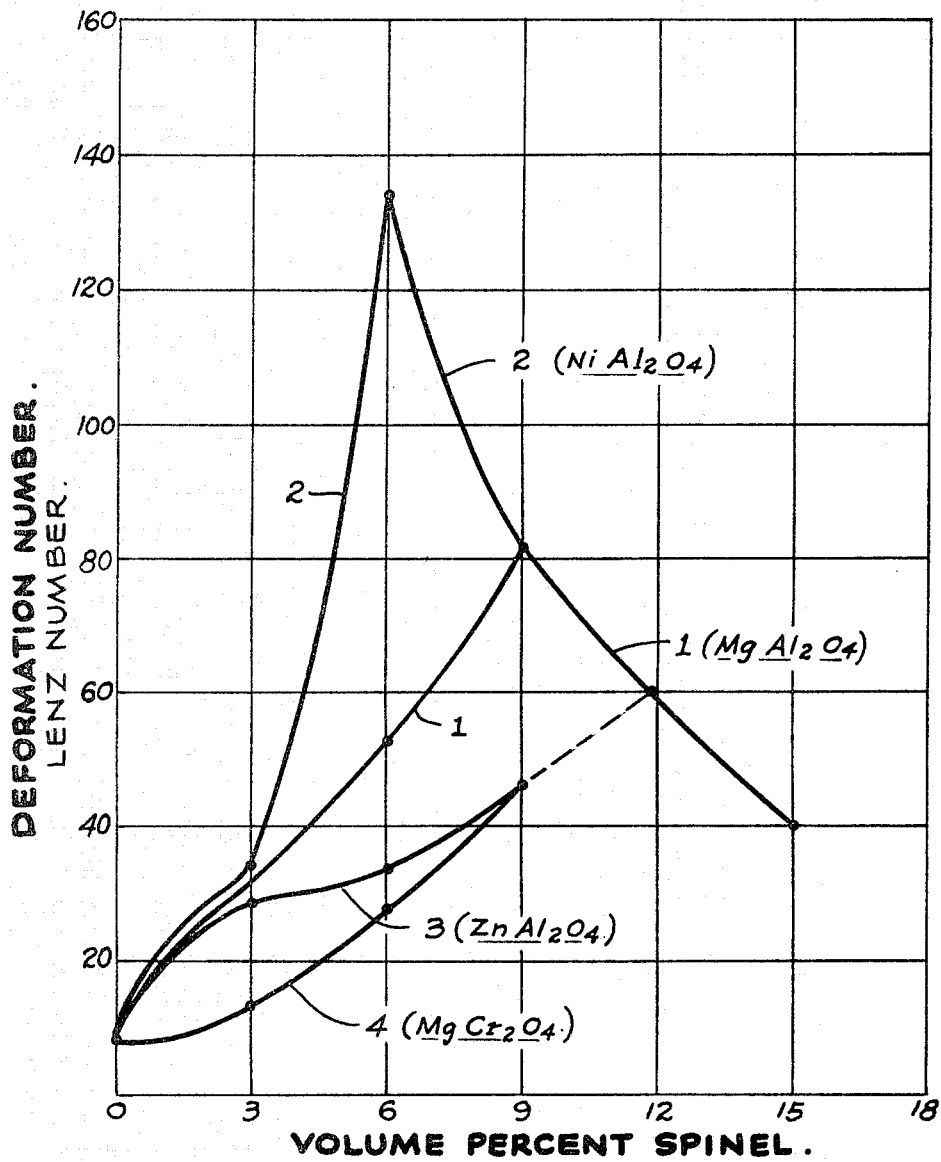

3,320,036
DUCTILE MOLYBDENUM COMPOSITION CONTAINING A SPINEL DISPERSION
David M. Scruggs, Southfield, Mich., assignor to The Bendix Corporation, Southfield, Mich., a corporation of Delaware
Filed Oct. 26, 1964, Ser. No. 406,223
3 Claims. (Cl. 29—182.5)

The present invention relates to a new and improved molybdenum composition having improved low temperature (room temperature) ductility compared to commercial grade molybdenum compositions known heretofore in the prior art.

To the extent the present invention contains inventive subject matter in common with my prior application Ser. No. 182,074, now Patent No. 3,175,279, filed Mar. 23, 1962, entitled, "Ductile Chromium Composition," and predecessor application Ser. No. 88,302, filed Feb. 10, 1961, and now abandoned, the present application is a continuation-in-part of these prior applications having common inventorship and assignee therewith.

Whereas certain forms of commercial grade molybdenum are extremely brittle at room temperature which seriously limits the use of this metal and adds considerably to the cost of machining or otherwise forming molybdenum articles.

I have discovered that when spinels or spinel-like oxide formations in finely-divided form are distributed throughout a molybdenum body, and the molybdenum body is held at elevated temperatures for a period of time, the spinels act as repositories for the minute amounts of embrittling impurities (such as nitrogen, oxygen, carbon, sulphur and perhaps hydrogen) and thereby purify the molybdenum metal which increases room temperature ductility to a degree not heretofore obtainable except by prohibitively-expensive laboratory techniques.

Spinels are a mixture of a metal monoxide and a metal sesquioxide which combine according to the general formula $MO \cdot M_2O_3$ (or $MM_2O_4$) where the M's may be the same or dissimilar metals. The monoxide and sesquioxide unite in a complex cubic crystalline structure. However, the cubic crystalline form is not critical to the practice of the present invention and certain metal oxides which combine according to the spinel formula but do not have perfect cubic symmetry can be used. The term "spinel-like oxides" used herein refers to the broader category of true spinels and those compositions corresponding to the spinel formula but having a distorted lattice structure.

More specifically, the true spinel structure is essentially a close-packed face centered cubic array of oxygen ions with divalent cations in one-eighth of the tetrahedral vacancy positions and trivalent cations in one-half the octahedral vacancy positions. Inverse spinels exchange positions of the divalent ions with trivalent. The same coordination may be held while the lattice is distorted by larger-divalent ions as in $CaCr_2O_4$ forming a distorted quasi-spinel structure which is no longer of cubic symmetry, but remains functional as an electronic isomorph.

It is an object of my invention to provide a composition consisting predominantly of molybdenum with a small percentage of spinel or spinel-like metal oxides distributed throughout to significantly increase room temperature ductility of the molybdenum body even though the molybdenum constituent is formed of relatively impure commercial grade molybdenum powder.

Other objects and advantages of the present invention will become apparent with reference to the accompanying description and drawing.

*Example I*

To provide a control reference for comparison purposes, a composition of 100% commercial grade —325 mesh molybdenum powder (nominally 2–3 microns) was die pressed at 20,000 p.s.i. to form a ⅛″ thick by ½″ diameter pellet.

This 100% molybdenum pellet was then sintered in a corundum tube within a graphite resistor furnace in dry hydrogen (palladium purified) to 2700° F., then in argon to 3200° F. and sintered for four hours at 3200° F. The sintered pellet had a density greater than 90% of theoretical density.

The pellet was then ground to a flat finish on one side with emery paper and tested for brittleness and/or ductility. The brittleness-ductility test consisted of placing the pellet in a conventional Brinell hardness test machine with a 10 mm. Brinell indenting ball in place. Load was applied until the specimen pellet cracked, whereupon the diameter of the impression made by the indenter at failure was measured in millimeters and recorded. It has been found that the volume of metal displaced by the Brinell indenter at failure is a measure of the brittleness or ductility of the specimen. Further, that the volume of metal displaced increases very nearly as the fourth power of the indentation diameter. Thus, raising the measured diameter to the fourth power gives a ductility-brittleness deformation number which can usefully be used for ductility comparison with other pellets tested in the same manner.

The deformation number for the pellet made from 100% molybdenum powder was 8 as recorded on the graph of the accompanying drawing above the 0% spinel (100% molybdenum) abscissa point.

The brittleness-ductility test briefly described above was developed by William H. Lenz, associated with the Los Alamos Scientific Laboratory, and is more fully set forth in Los Alamos Scientific Laboratory Report LAMS–2906 entitled, "A New Brittleness Test for Powder Metallurgy Materials," which can be obtained through the Office of Technical Services, U.S. Department of Commerce. The deformation number is thus also called the Lenz ductility number and has been simply abbreviated to "Lenz number" in the accompanying graph.

*Examples II–VI*

Five pellets having varying percentages of magnesium aluminate, $MgAl_2O_4$ spinel were then prepared. The volume percent ratio of molybdenum to spinel for these tests are set forth in tabular form, together with the measured deformation or Lenz number as follows:

| Example | Molybdenum, Volume Percent | Spinel ($Mg Al_2O_4$), Volume Percent | Deformation or Lenz No. |
|---|---|---|---|
| II | 97 | 3 | 33 |
| III | 94 | 6 | 53 |
| IV | 91 | 9 | 81 |
| V | 88 | 12 | 81 |
| VI | 85 | 15 | 39 |

The molybdenum-spinel compositions of the above examples were obtained by mixing in a rotary blender for ½ hour measured quantities of —325 mesh spinel powder and —325 mesh molybdenum powder. The blended molybdenum-spinel powder was then die pressed, sintered and tested for brittleness in an identical manner to that described in Example I of the 100% molybdenum control sample. The densities of the specimens of Examples II through VI were all greater than 90% of theoretical density.

The results of the ductility tests for these examples are plotted and connected by curve #1 of the drawings, which shows a sharp increase in ductility with increasing spinel content up to a maximum which occurs with a spinel content of approximately 9 volume percent. Further increases in spinel content reduces ductility. The curve slope reversal proceeding in opposite directions from the 9% spinel point is explained as follows. Certain types of molybdenum have a brittle-ductile transition temperature of 250° C. Above this temperature, molybdenum displays ductile properties, whereas below this temperature the metal is extremely brittle as recorded in Example I. With the addition of progressively-increasing quantities of spinel from 0 up to 9 volume percent, the spinel captures progressively more impurities such as nitrogen and oxygen and other interstitials by combining with them at the elevated sintering temperature. This mechanism is particularly effective in that large proportions of the free interstitials are absorbed and not re-released. Thus, the molybdenum matrix metal is progressively more pure or free from embrittling impurities and will have a ductility which approaches that exhibited by molybdenum above its transition temperature. At the 9% spinel point, maximum ductility inherent in the molybdenum-spinel composition has been achieved by purification and further spinel addition follows the normal descending pattern of dispersion hardening by the addition of progressively larger quantities of ceramic in a base metal.

*Examples VII–XV*

Whereas Examples II–VI all utilized magnesium aluminate spinel, other spinel types may be used in the practice of the present invention. The following additional test pellets were prepared in the identical manner previously described wherein the spinel type or proportions were varied with results as follows:

| Example | Molybdenum, Volume Percent | Spinel | | Deformation or Lenz No. |
|---|---|---|---|---|
| | | Type | Volume Percent | |
| VII | 97 | $NiAl_2O_4$ | 3 | 34 |
| VIII | 94 | $NiAl_2O_4$ | 6 | 134 |
| IX | 91 | $NiAl_2O_4$ | 9 | 82 |
| X | 97 | $ZnAl_2O_4$ | 3 | 28 |
| XI | 94 | $ZnAl_2O_4$ | 6 | 33 |
| XII | 91 | $ZnAl_2O_4$ | 9 | 46 |
| XIII | 88 | $ZnAl_2O_4$ | 12 | 61 |
| XIV | 97 | $MgCr_2O_4$ | 3 | 13 |
| XV | 94 | $MgCr_2O_4$ | 6 | 28 |

These results are plotted on the accompanying drawing whereby curve #2 represents nickel aluminate ($NiAl_2O_4$) spinel; curve #3 zinc aluminate ($ZnAl_2O_4$) spinel; and curve #4 magnesium chromate ($MgCr_2O_4$). As indicated, these spinels all cause a significant increase of ductility and approach the negative slope portions of curves 1 and 2 as an upper ductility limit. The most striking improvement from the spinels tested is obtained from nickel aluminate and magnesium aluminate.

As indicated by the results obtained, improved ductility of room temperature molybdenum may be obtained with spinel additions of less than about 18% by volume. The preferred range giving good repeatability and to facilitate duplication under normal production standards can be achieved with spinel contents from 3 to 12% by volume.

It will be appreciated that spinels are abundantly available, are generally of low cost, and in the percentages employed, provide minimum dilution of the molybdenum material. Thus, the invention provides a low cost practical means to achieve molybdenum ductility readily adaptable to large scale production needs, while causing a minimum effect to the base metal properties.

While the invention has been described in detail with reference to specific examples relating to selected test work, it is my intention to cover all variations in the invention herein disclosed coming within the scope of my teachings to the extent permitted by the prior art and defined in the appended claims.

I claim:
1. A ductile molybdenum composition consisting essentially of a sintered molybdenum composite having a spinel-like ceramic dispersed uniformly throughout, said spinel-like ceramic being in finely-divided form and comprising less than about 18% of the total volume of the two materials.

2. A ductile molybdenum composition consisting essentially of a sintered molybdenum composite having a spinel-dispersed uniformly throughout, said spinel being in finely-divided form and comprising less than about 18% of the total volume of the two materials, and said spinel is selected from the groups consisting of nickel aluminate, magnesium aluminate, zinc aluminate, magnesium chromate, and mixtures of any of nickel aluminate, magnesium aluminate, zinc aluminate and magnesium chromate.

3. A ductile molybdenum composition consisting essentially of a sintered molybdenum composite having a spinel dispersed throughout, said spinel being in finely-divided form and comprising about 3 to 12 percent of the total volume of the two materials, and said spinel selected from the group consisting of nickel aluminate, magnesium aluminate and mixtures of nickel aluminate and magnesium aluminate.

References Cited by the Examiner

UNITED STATES PATENTS

| | | |
|---|---|---|
| 2,431,660 | 12/1945 | Gaudenzi. |
| 2,903,544 | 9/1959 | Reichelt _____ 29—182.5 X |
| 2,972,529 | 2/1961 | Alexander. |
| 3,019,103 | 1/1962 | Alexander _____ 29—182.5 X |
| 3,024,110 | 3/1962 | Funkhouser _____ 75—206 |
| 3,085,876 | 4/1963 | Alexander _____ 29—182.5 X |
| 3,087,234 | 4/1963 | Alexander _____ 29—182.5 |
| 3,105,760 | 10/1963 | Grant _____ 29—182.5 |
| 3,148,981 | 9/1964 | Ryshkewitch _____ 75—206 |

CARL D. QUARFORTH, *Primary Examiner.*

BENJAMIN R. PADGETT, *Examiner.*

A. J. STEINER, *Assistant Examiner.*